Patented Dec. 8, 1931

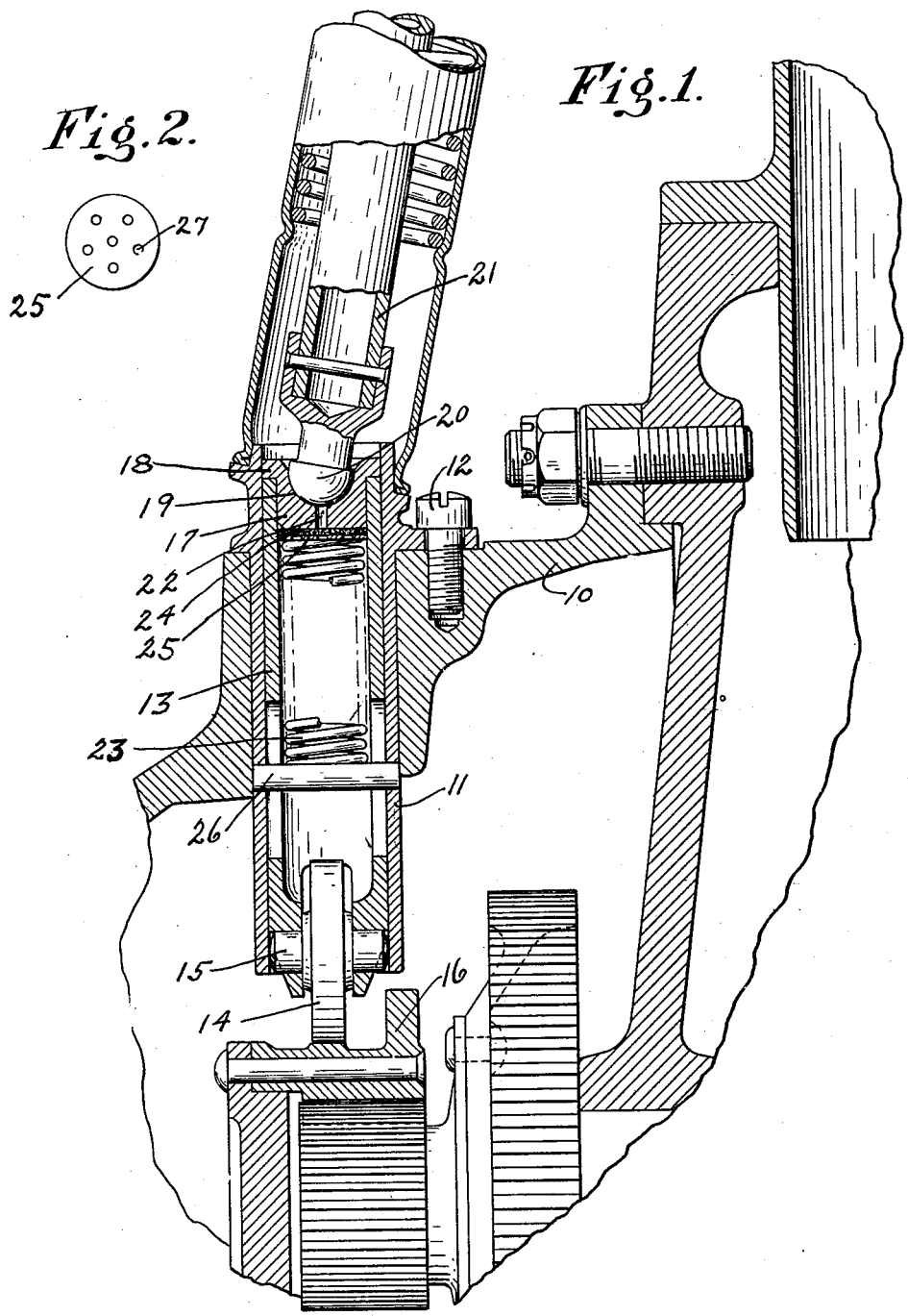

1,835,622

UNITED STATES PATENT OFFICE

ANDREW V. D. WILLGOOS, OF WEST HARTFORD, CONNECTICUT, ASSIGNOR TO THE PRATT & WHITNEY AIRCRAFT COMPANY, OF HARTFORD, CONNECTICUT, A CORPORATION OF DELAWARE

TAPPET CONSTRUCTION

Application filed February 26, 1930. Serial No. 431,596.

This invention relates to internal combustion engines and particularly to a cam operated tappet for engines of the above type adapted for aircraft use.

A primary object of the present invention is to improve the construction of tappets to enable bearing surfaces formed therein to be better lubricated.

A feature of importance of the invention is that the socket member formed or inserted within the tappet is provided with an opening extending from the bearing surface for a push rod ball to the interior of the tappet which is open to the crank case of the engine, thus enabling lubricant to enter and pass through the hole to the bearing surface.

Another object of the invention is to provide a porous washer positioned against the interior surface of the socket member adjacent the opening therein so that lubricant may be retained therein and from which it may lubricate the bearing surfaces of the socket.

With these and other objects in view my invention includes the features of construction and operation set forth in the following specification and illustrated in the accompanying drawings.

In the accompanying drawings annexed hereto and forming a part of this specification, I have shown my invention embodied in an internal combustion engine of the radial type, but it will be understood that the invention may be otherwise embodied and that the drawings are not to be construed as defining or limiting the scope of the invention, the claims appended to this specification being relied upon for that purpose.

In the drawings:

Fig. 1 shows a fragmentary longitudinal section of an engine having a tappet made in accordance with the present invention, and Fig. 2 shows a detail view of one of the washers used therewith.

In the above mentioned drawings, I have shown but one embodiment of the invention which is now deemed preferable, but it is to be understood that changes and modifications may be made within the scope of the appended claims without departing from the spirit of the invention.

Briefly, and in its preferred aspect, my invention may include the following principal parts: First, an engine casing or frame member; second, a tappet slidably mounted therein; third, a socket member within said tappet having a bearing surface for a valve push rod; fourth, a porous lubricant retaining washer supported against an internal surface of said socket; and fifth, an opening through said socket member from said bearing surface to the surface against which said porous washer engages.

Referring more in detail to the figures of the drawings, I provide an engine frame member 10 with tappet guides or sleeves 11, one only of which is shown. This sleeve 11 is held securely within the frame 10 by means of screws 12. Within the bushing or sleeve 11 is a tappet 13 fitted so that it may slide easily therein. At its lower end the tappet 13 is provided with a roller 14 rotatable upon the pin 15. This roller 14 is adapted to engage a cam 16 and actuate the tappet 13 in the usual and well-known manner.

At the upper end of the tappet 13 is a socket member 17 preferably forced tightly within the tappet with a flange 18 thereon in contact with the end surface of the tappet so that it will be retained firmly in position therein. The socket 17 within its outer surface has a semi-spherical recess 19 forming a bearing surface for the ball 20 on the end of a push rod 21. This semi-spherical surface 19 has its periphery chamfered as shown so that the rod 21 may have free angular movement. Between the bearing surface 19 of the socket 17 and its inner face is an opening 22 preferably positioned centrally of the socket member for the supply of lubricant to the surface 19. In contact with the inner face of the socket 17 is a porous washer 24 which may be of chamois, felt or other lubricant absorbent material. Below this washer 24 is another washer 25 preferably of metal and provided with spaced holes 27 therethrough. To retain these washers 24 and 25 in place against the socket member 17 use is made of the helical extension spring 23, the upper end of which contacts with the washer 25 and the lower end engages against a cross pin 26 retained within the tappet guide 11. This spring 23 also serves to hold the tappet 13 resiliently upward.

The washer 24 may be initially impregnated with a suitable lubricant and the upper surface of the socket member 17 also may be well supplied with lubricant. During operation of the engine the space within the frame member 10, due to the rotative and other motions of the crank shaft and parts moving therewith, is completely filled with a vapor or mist formed by the agitation of the lubricant. This vapor enters and fills the space within the tappet 13, the reciprocatory motion of the tappet serving to force the lubricant against the porous washer 24 through the openings 27 in the supporting washer 25. The porous washer 24 is therefore maintained moistened with lubricant, and, being closely in contact with the socket member 17, causes lubricant to enter opening 22 and spread about the bearing surface 19. This action is aided by the varying amounts of impression to which the porous washer 24 is subjected by the action of the spring 23 expanding and contracting with the reciprocatory movements of the tappet 13. The bearing surface 19 of the socket member 17 is therefore continuously supplied with a small amount of lubricant.

What I claim is:

1. A tappet construction for internal combustion engines comprising, a hollow body member, a socket member secured thereto at one end and having a semi-spherical seat formed therein, an absorbent washer in contact with said socket member, and a spring supporting said washer in position, said socket member having an opening therethrough from said seat to the surface contacted by said washer.

2. A tappet construction for internal combustion engines comprising, a hollow body member, a socket at one end having a semi-spherical seat therein and an opening extending therethrough, an absorbent washer within said body member, and means to force said body member in one direction, said last mentioned means holding said washer against said socket.

In testimony whereof, I hereto affix my signature.

ANDREW V. D. WILLGOOS.